United States Patent
Liu et al.

(10) Patent No.: US 10,048,422 B2
(45) Date of Patent: Aug. 14, 2018

(54) LIGHT SOURCE ASSEMBLY, BACKLIGHT AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventors: Gang Liu, Beijing (CN); Yaling Kang, Beijing (CN); Qinggang Feng, Beijing (CN); Xudong Fang, Beijing (CN)

(73) Assignees: BOE TECHNOLOGY GROUP CO., LTD., Beijing (CN); HEFEI BOE DISPLAY LIGHT CO., LTD., Hefei, Anhui (CN)

(*) Notice: Subject to any disclaimer, the term of this patent is extended or adjusted under 35 U.S.C. 154(b) by 10 days.

(21) Appl. No.: 15/096,899

(22) Filed: Apr. 12, 2016

(65) Prior Publication Data

US 2016/0377790 A1  Dec. 29, 2016

(30) Foreign Application Priority Data

Jun. 29, 2015  (CN) .......................... 2015 1 0373507

(51) Int. Cl.
*F21V 7/04* (2006.01)
*F21V 8/00* (2006.01)

(52) U.S. Cl.
CPC .......... *G02B 6/0025* (2013.01); *G02B 6/003* (2013.01); *G02B 6/0023* (2013.01); *G02B 6/0073* (2013.01); *G02B 6/0083* (2013.01)

(58) Field of Classification Search
CPC .... G02B 6/0073; G02B 6/0023; G02B 6/003; G02B 6/0025; G02B 6/0083

(Continued)

(56) References Cited

U.S. PATENT DOCUMENTS

| 5,190,365 A * | 3/1993 | Cordy, Jr. ................ B60Q 3/64 |
| | | 362/223 |
| 2004/0120137 A1* | 6/2004 | Williams ............. G02B 6/0018 |
| | | 362/602 |

(Continued)

FOREIGN PATENT DOCUMENTS

| CN | 101387372 A | 3/2009 |
| CN | 102668156 A | 9/2012 |

(Continued)

OTHER PUBLICATIONS

Office Action dated Dec. 30, 2016 issued in corresponding Chinese Application No. 201510373507.6.

(Continued)

*Primary Examiner* — Claude J Brown
(74) *Attorney, Agent, or Firm* — Nath, Goldberg & Meyer; Joshua B. Goldberg; Stanley N. Protigal

(57) ABSTRACT

A light source assembly, a backlight and a display device are provided. The light source assembly comprises a bar-shaped light source unit, which comprises an organic light-emitting diode for emitting light and has a light outgoing side; and a light concentration bar, which has a light incidence surface and a light outgoing surface opposite to each other, the light incidence surface being disposed at an outer side of the light outgoing side of the light source unit and matching with the light outgoing side in size, and the light outgoing surface matching with a light incidence side of a light guide plate in size.

14 Claims, 2 Drawing Sheets

(58) Field of Classification Search
USPC .......................................................... 362/608
See application file for complete search history.

(56) References Cited

U.S. PATENT DOCUMENTS

| | | |
|---|---|---|
| 2005/0070196 A1 | 3/2005 | Colombo et al. |
| 2007/0052882 A1* | 3/2007 | Hwang ................ G02B 6/0056 349/62 |
| 2007/0064417 A1* | 3/2007 | Hatanaka ............ G02B 6/0028 362/231 |
| 2010/0246210 A1* | 9/2010 | Yashiro ................ G02B 6/0026 362/606 |
| 2013/0322114 A1* | 12/2013 | Nishitani ............. G02B 6/0051 362/606 |
| 2014/0029294 A1* | 1/2014 | Huang ................. G02B 6/0035 362/606 |
| 2014/0036538 A1 | 2/2014 | You et al. |
| 2014/0126238 A1* | 5/2014 | Kao ..................... G02B 6/0065 362/608 |
| 2014/0209581 A1* | 7/2014 | Pawlowski ............ B23K 26/03 219/121.69 |
| 2014/0307467 A1* | 10/2014 | Jia ........................ G02B 6/002 362/608 |
| 2015/0219817 A1* | 8/2015 | Kim ....................... G02B 6/004 362/607 |
| 2015/0280165 A1* | 10/2015 | Lee ..................... H01L 51/5084 257/40 |
| 2015/0316224 A1* | 11/2015 | Okubo ................ F21S 48/1283 362/520 |
| 2016/0356941 A1* | 12/2016 | Ju ........................ G02B 6/0023 |
| 2017/0069876 A1* | 3/2017 | Popp ..................... H01L 51/448 |
| 2017/0146717 A1* | 5/2017 | Zeng .................... G02B 6/0026 |

FOREIGN PATENT DOCUMENTS

| | | |
|---|---|---|
| CN | 103363362 A | 10/2013 |
| CN | 103807664 A | 5/2014 |
| CN | 104132275 A | 11/2014 |
| WO | 2012129824 A1 | 10/2012 |

OTHER PUBLICATIONS

The Second Office Action dated Jun. 21, 2017 corresponding to Chinese application No. 201510373507.6.
Chinese office action dated Nov. 16, 2017 for corresponding CN application 201510373507.6 with English translation attached.

* cited by examiner

LIGHT SOURCE ASSEMBLY, BACKLIGHT AND DISPLAY DEVICE

CROSS-REFERENCE TO RELATED APPLICATION

This application claims the benefit of priority to China Patent Application No. 201510373507.6, titled "Light Source Assembly, Backlight and Display Device" and filed on Jun. 29, 2015, the content thereof being incorporated herein by reference.

TECHNICAL FIELD

The present disclosure belongs to the field of display technology, and specifically relates to a light source assembly, a backlight and a display device.

BACKGROUND

A backlight is used to provide incident light for the liquid crystal display panel of a liquid crystal display device. An edge-type backlight comprises a light guide plate and a light source. The light source is bar-shaped, and light emitted from the light source enters into the light guide plate from a side (i.e., light incidence side) of the light guide plate, exits from the top of the light guide plate after being reflected, and is then provided to the liquid crystal display panel.

In the existing backlight, LED light bar is mainly used as the light source. The LED light bar is formed by arranging a plurality of LED lights on a bar-shaped circuit board. As shown in FIG. 1, the LED light 91 is actually a point light source and there is a space between adjacent LED lights 91, thus, if optical distance is insufficient due to too short distance between the LED light bar 9 and the light guide plate 8, portions, corresponding to the LED lights 91, of the edge of the light guide plate 8 have higher brightness, whereas portions corresponding to the spaces between the LED lights 91 have lower brightness. That is, hot spot phenomenon may occur, which influences the display effect.

SUMMARY

In view of the problem that the hot spot phenomenon may occur to an existing backlight, embodiments of the present disclosure provide a light source assembly, a backlight and a display device which can avoid occurrence of the hot spot phenomenon.

In one aspect, an embodiment of the present disclosure provides a light source assembly, comprising:

a bar-shaped light source unit, which comprises an organic light-emitting diode for emitting light and has a light outgoing side; and a light concentration bar which has a light incidence surface and a light outgoing surface opposite to each other, the light incidence surface being disposed at an outer side of the light outgoing side of the light source unit and matching with the light outgoing side in size, and the light outgoing surface matching with a light incidence side of a light guide plate in size.

Optionally, the light source further comprising: a housing for accommodating the organic light-emitting diode, the housing having a top located at the light outgoing side of the light source unit and formed by a transparent material.

Optionally, faces, facing the organic light-emitting diode, of other parts than the top of the house are reflective faces.

Optionally, the housing has a bottom opposite to the top and a plurality of sides connected between the top and the bottom; the organic light-emitting diode comprises an anode, a light emitting layer and a cathode that are sequentially disposed, wherein the anode or the cathode is disposed on the bottom of the housing; and one side of the housing along a length direction of the light source unit comprises a driving circuit for driving the organic light-emitting diode.

Optionally, the side comprising the driving circuit is a flexible circuit board.

Optionally, the light concentration bar is formed by a transparent material, and comprises sides connected between the light incidence surface and the light outgoing surface, and reflective layers are provided on the sides.

Optionally, the light concentration bar further comprises a micro-diffusion structure for diffusing incident light.

Optionally, the micro-diffusion structure is disposed on the light incidence surface of the light concentration bar.

Optionally, the micro-diffusion structure is a concave-convex structure on the light incidence surface.

Optionally, the light incidence surface of the light concentration bar has a width larger than that of the light outgoing surface of the light concentration bar.

In another aspect, an embodiment of the present disclosure provides a backlight, comprising:

a light guide plate; and the light source assembly as mentioned above, the light source being disposed at a light incidence side of the light guide plate.

In still another aspect, an embodiment of the present disclosure provides a display device comprising the above mentioned backlight.

DETAILED DESCRIPTION OF THE EMBODIMENTS

In order that those skilled in the art can better understand the technical solutions of the embodiment of the present disclosure, the embodiment of the present invention will be further described in detail below in conjunction with the accompanying drawings and specific embodiments.

Embodiment 1

Figure 1:
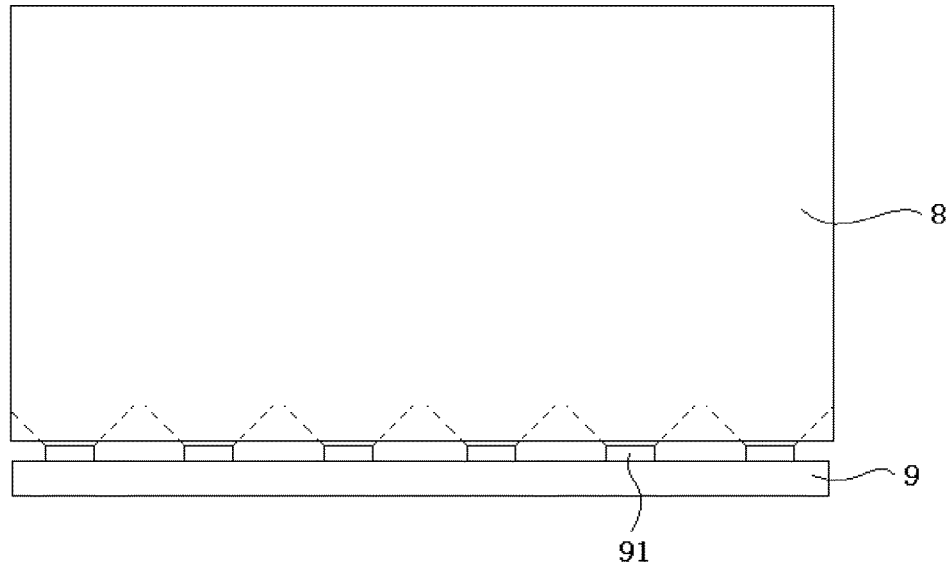
FIG. 1 is a schematic top view of an existing backlight.
Figure 2:
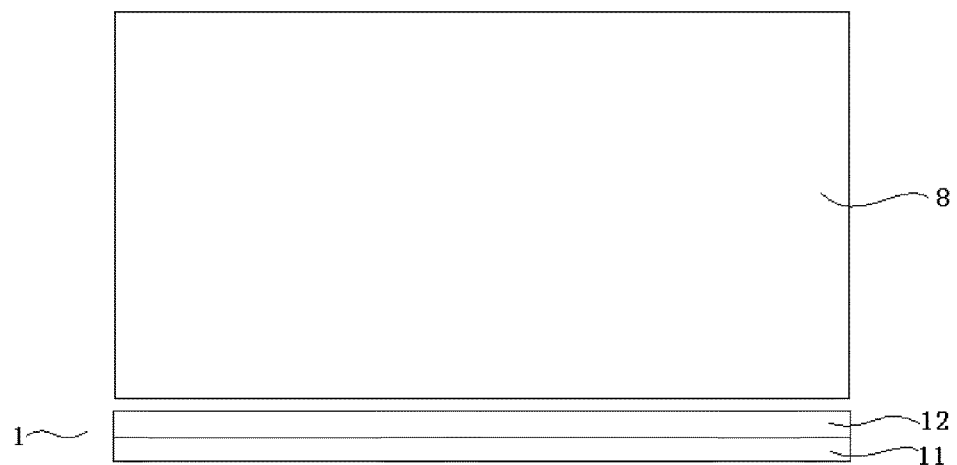
FIG. 2 is a schematic top view of an example of a backlight of an embodiment of the present disclosure.
Figure 3:
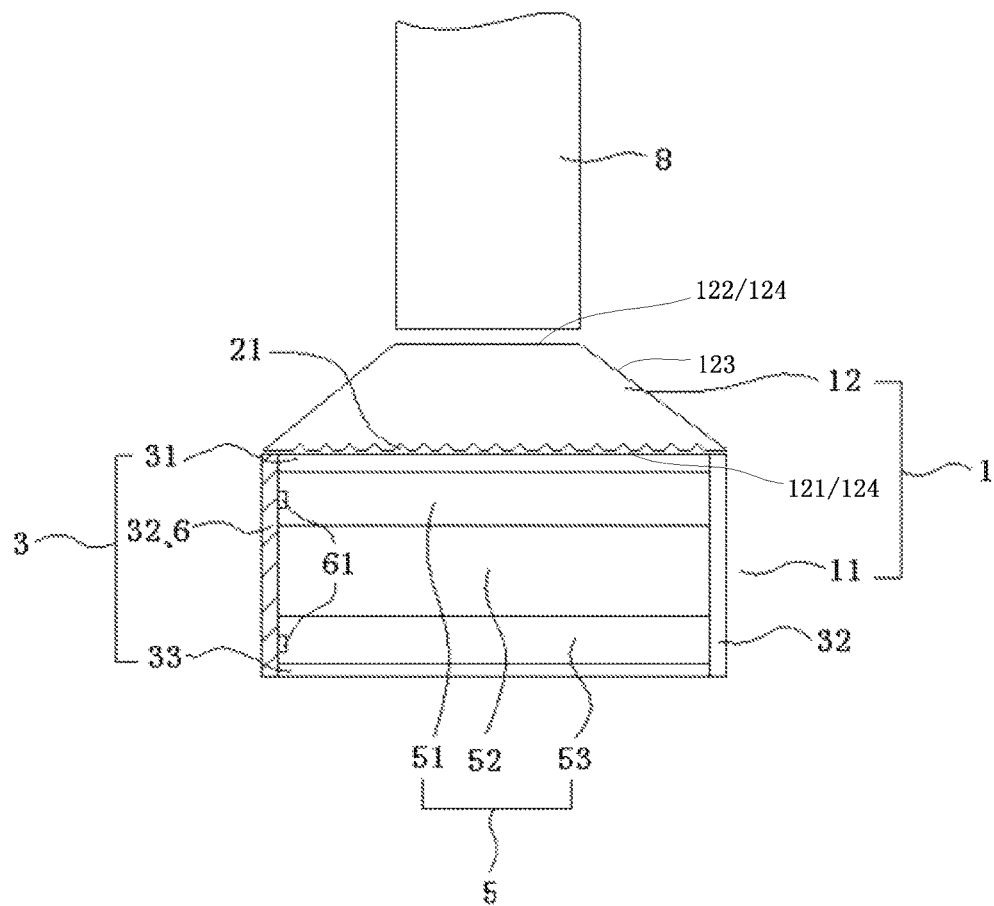
FIG. 3 is a schematic cross-sectional view of an example of a backlight of an embodiment of the present disclosure.

As shown in FIGS. 2 and 3, the present embodiment provides a light source assembly 1 comprising:

a bar-shaped light source unit 11, which comprises an organic light-emitting diode 5 for emitting light and has a light outgoing side; and a light concentration bar 12, which has a light incidence surface and a light outgoing surface opposite to each other, the light incidence surface is disposed at an outer side of the light outgoing side of the light source unit 11 and matches with the light outgoing side in size, and the light outgoing surface matches with a light incidence side of a light guide plate 8 in size.

That is to say, as shown in FIG. 3, the light source assembly 1 of the present embodiment is formed by the light source unit 11 and the light concentration bar 12. The light source unit 11 emits light by using the organic light-emitting diode (OLED) 5, and has the light outgoing side from which light exits. The light concentration bar 12 is disposed at the light outgoing side of the light source unit 11, the light incidence surface thereof has the same width as that of the light outgoing side of the light source unit 11, and the light outgoing surface thereof has a width identical to a thickness of the light guide plate 8 (i.e., the width of the light incidence side of the light guide plate 8).

Since the organic light-emitting diode 5 is an area light source having uniform light intensity everywhere, the hot spot phenomenon can be avoided when the organic light-emitting diode 5 is employed as a linear light source. In addition, the organic light-emitting diode 5 generally has a low light intensity per unit area. Thus, in order to satisfy requirement for light intensity, the width of the light outgoing side of the light source unit 11 is generally larger than the thickness (i.e., the width of the light incidence side) of the light guide plate 8, but, in this way, not all light emitted by the light source unit 11 can enter into the light guide plate 8. Thus, in order to improve utilization efficiency of light, the light concentration bar 12 is provided on the light source unit 11. The width of the light incidence surface of the light concentration bar 12 may be set larger than that of the light outgoing surface thereof, which can reduce the width of the irradiation range of light emitted by the light source unit 11, and allow all light emitted by the light source unit 11 to be guided into the light guide plate 8, thereby improving the light intensity per unit area and the utilization efficiency of light as well.

Optionally, the light source assembly 1 further comprises a housing 3 for accommodating the organic light-emitting diode 5. The housing 3 has a top 31 located at the light outgoing side of the light source unit 11, and the top 31 is formed by a transparent material.

That is, as shown in FIG. 3, in order to protect the organic light-emitting diode 5, the organic light-emitting diode 5 may be accommodated in a case (e.g., housing 3). Inner size of the housing 3 may exactly match with outer size of the organic light-emitting diode 5. In order that the light source assembly 1 can emit light to outside, portion of the housing 3 at the light outgoing side, i.e., the top is set to be transparent.

Optionally, faces, facing the organic light-emitting diode 5, of other portions than the top 31 of the housing 3 are reflective faces.

That is, except the top 31, at least the sides of the remaining portions of the housing 3 facing the organic light-emitting diode 5 can reflect light. For example, the remaining portions of the housing 3 may be made of a highly reflective plastic which is silvery or white; alternatively, reflective films may be attached to the inner faces of the remaining portions of the housing 3. The reason for employing the foregoing manner is that the organic light-emitting diode 5 emits light in all directions, and the light can be reflected back by the reflective faces and finally be emitted out from the light outgoing side, thereby improving the utilization efficiency of light. Further, in the prior art, in order to reflect back light emitted in other directions by a LED light bar, a reflecting shade needs to be provided to cover the LED light bar. Since the light source assembly 1 of the present embodiment has the above housing 3, the reflecting shade can be omitted and thus the structure of the backlight is simplified.

Optionally, the housing 3 has a bottom 33 opposite to the top 31 and a plurality of sides 32 connected between the top 31 and the bottom 33. The organic light-emitting diode 5 includes an anode 51, a light emitting layer 52 and a cathode 53 which are sequentially arranged, wherein the anode 51 or the cathode 53 is disposed on the bottom 33. One side 32 along the length direction of the light source unit 11 comprises a driving circuit 61 for driving the organic light-emitting diode 5. Optionally, the above mentioned side 32 comprising the driving circuit 61 is a flexible circuit board 6.

That is to say, optionally, by using the bottom 33 of the housing 3 as the substrate, the organic light-emitting diode 5 is formed by sequentially forming the cathode 53, the light emitting layer 52 and the anode 51 (since the anode 51 is generally formed by a transparent material such as indium tin oxide, preferably the cathode 53 is disposed on the bottom 33 of the housing 3, whereas the anode is disposed at the light outgoing side of the light source unit 11). Further, the driving circuit 61 of the organic light-emitting diode 5 is preferably disposed at a side 32 of the housing 3 (more preferably, a flexible circuit board 6 is used as the side 32). In this way, when manufacturing the organic light-emitting diode 5, an organic light-emitting diode 5 with a large size, as an area light source, may be formed on the substrate (the bottom 33) at first. Due to process limitation, defects generally occur in some parts of the area light source. Thus, a plurality of bar light sources without defect may be cut from the area light source as required, and a flexible circuit board 6 is provided at one side of a bar light source, and the other sides of the bar light source is closed by the housing 3, thus obtaining the above light source unit 11. This manner facilitates to improve the utilization efficiency of an organic light-emitting diode product.

Optionally, the light concentration bar 12 is formed by a transparent material, and comprises sides 123 connected between the light incidence surface 121 and the light outgoing surface 122, and reflective layers are provided on the sides.

That is to say, the light concentration bar 12 disposed at an outer side of the light outgoing side of the light source unit 11 may be formed by way of injection moulding using a transparent material such as PMMA (polymethyl methacrylate), PC (polycarbonate), PS (polystyrene), etc. The light concentration bar 12 has the light incidence surface and the light outgoing surface opposite to each other and connected by multiple sides (in the present embodiment, there are four sides). Thus, the cross section of the light concentration bar 12 may be a trapezoid (of course, the sides thereof may be replaced by arcs or other forms). Preferably, reflective layers (e.g., attached reflective films) are provided on the sides of the light concentration bar 12, in order that light emitted to the sides are reflected back to the light concentration bar 12, thereby improving the utilization efficiency of light.

The light concentration bar 12 may have other form, for example, the sides thereof may be a frame made of a reflective metal, and openings 124 are formed at the light incidence surface 121 and the light outgoing surface 122 thereof.

Optionally, the light concentration bar 12 further comprises micro-diffusion structure 21, which is preferably disposed on the light incidence surface.

Due to limitations of microenvironment (current, temperature, and the like), manufacturing process, and the like, light intensities at some positions of the organic light-emitting diode 5 may change with use. To this end, a structure capable of changing propagation direction of light, i.e., the micro-diffusion structure 21 for diffusing incident light as shown in FIG. 3, may be provided in the light concentration bar 12. When light intensity of a certain part of the organic light-emitting diode 5 changes, since the micro-diffusion structure 21 can diffuse light emitted from this part to other parts, and diffuse light of other parts to this part, light emitted from each part of the organic light-emitting diode 5 is uniform, thereby reducing the influence to display due to variation of local light intensity. Optionally, in order that diffused light can travel a long distance so as to be mixed sufficiently (i.e., to acquire a sufficient optical distance), the micro-diffusion structure 21 is preferably disposed on the light incidence surface. Specifically, the micro-diffusion structure 21 may be a concave-convex structure on the light incidence surface (for convenience of manufacturing), such as depressions, protrusions, grooves, ripples, sawteeth, or the like.

In the light source assembly of the embodiment of the present disclosure, an organic light-emitting diode is used as the light source; since the organic light-emitting diode is an area light source having uniform light intensity everywhere, the hot spot phenomenon can be avoided. In addition, the organic light-emitting diode generally has a low light intensity per unit area, thus, in order to satisfying requirement for light intensity, the width of the light outgoing side of the light source unit is set larger than the thickness of the light guide plate, and the light concentration bar is used to reduce the width of the irradiation range of light emitted by the light source unit, and allow all light emitted by the light source unit to be guided into the light guide plate, so that the light intensity per unit area is improved and the organic light-emitting diode can be used in the backlight. In addition, since an organic light-emitting diode has a wider luminescence spectrum than a LED, the light source assembly provided by the present embodiment of the disclosure can widen the color range of a liquid crystal display. Further, since an organic light-emitting diode has lower heat radiation than a LED, the light source assembly provided by the embodiment of the present disclosure can elongate service life of the backlight.

As shown in FIGS. 2 and 3, the present embodiment further provides a backlight comprising:

the light guide plate 8; and the light source assembly 1 disposed at a light incidence side of the light guide plate 8.

That is, the light source assembly 1 may be disposed at an outer side of the light incidence side of the light guide plate 8 so as to provide light for the light guide plate 8. Of course, the backlight may further comprise a frame, optical films and the like to form a backlight of a liquid crystal display device.

Embodiment 2

The present embodiment provides a display device, which comprises the above backlight.

Specifically, the display device may be any product or component having a display function such as a liquid crystal display panel, a mobile telephone, a tablet computer, a television, a display, a notebook computer, a digital photo frame, a navigator, or the like.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A light source assembly, comprising:
a bar-shaped light source unit, which comprises an organic light-emitting diode for emitting light and has a light outgoing side; and
a light concentration bar, which has a light incidence surface and a light outgoing surface opposite to each other, the light incidence surface being disposed at an outer side of the light outgoing side of the light source unit and matching with the light outgoing side in size, and the light outgoing surface matching with a light incidence side of a light guide plate in size,
wherein the light concentration bar comprises side surfaces connected between the light incidence surface and the light outgoing surface, and the side surfaces constitute a frame made of a reflective metal and having openings at the light incidence surface and the light outgoing surface,
wherein the light source assembly further comprises a housing for accommodating the organic light-emitting diode, the housing has a top located at the light outgoing side of the light source unit, a bottom opposite to the top and a plurality of sides connected between the top and the bottom, the bottom is on a side of the organic light-emitting diode distal to the light concentration bar, the plurality of sides encircles the organic light-emitting diode and have a length in a thickness direction of the organic light-emitting diode, the length being equal to a thickness of the organic light-emitting diode, the top is formed by a transparent material, and faces, facing the organic light-emitting diode, of the bottom and the plurality of sides of the housing are reflective faces.

2. The light source assembly of claim 1, wherein
the organic light-emitting diode comprises an anode, a light emitting layer and a cathode which are sequentially disposed, wherein the anode or the cathode is disposed on the bottom of the housing; and
one side of the housing along a length direction of the light source unit comprises a driving circuit for driving the organic light-emitting diode.

3. The light source assembly of claim 2, wherein
the side comprising the driving circuit is a flexible circuit board.

4. The light source assembly of claim 1, wherein
the light concentration bar further comprises a micro-diffusion structure for diffusing incident light.

5. The light source assembly of claim 4, wherein
the micro-diffusion structure is disposed on the light incidence surface of the light concentration bar.

6. The light source assembly of claim 5, wherein
the micro-diffusion structure is a concave-convex structure on the light incidence surface.

7. The light source assembly of claim 1, wherein
the light incidence surface of the light concentration bar has a width larger than that of the light outgoing surface of the light concentration bar.

8. A backlight, comprising:
a light guide plate; and
the light source assembly of claim 1, the light source assembly being disposed at a light incidence side of the light guide plate.

9. A display device, comprising a backlight which comprises a light guide plate and a light source assembly disposed at a light incidence side of the light guide plate, wherein the light source assembly comprises:
- a bar-shaped light source unit, which comprises an organic light-emitting diode for emitting light and has a light outgoing side; and
- a light concentration bar, which has a light incidence surface and a light outgoing surface opposite to each other, the light incidence surface being disposed at an outer side of the light outgoing side of the light source unit and matching with the light outgoing side in size, and the light outgoing surface matching with a light incidence side of a light guide plate in size,
- wherein the light concentration bar comprises side surfaces connected between the light incidence surface and the light outgoing surface, and the side surfaces constitute a frame made of a reflective metal and having openings at the light incidence surface and the light outgoing surface,
- wherein the light source assembly further comprises a housing for accommodating the organic light-emitting diode, the housing has a top located at the light outgoing side of the light source unit, a bottom opposite to the top and a plurality of sides connected between the top and the bottom, the bottom is on a side of the organic light-emitting diode distal to the light concentration bar, the plurality of sides encircles the organic light-emitting diode and have a length in a thickness direction of the organic light-emitting diode, the length being equal to a thickness of the organic light-emitting diode, the top is formed by a transparent material, and faces, facing the organic light-emitting diode, of the bottom and the plurality of sides of the housing are reflective faces.

10. The display device of claim 9, wherein
the organic light-emitting diode comprises an anode, a light emitting layer and a cathode that are sequentially disposed, wherein the anode or the cathode is disposed on the bottom of the housing; and
one side of the housing along a length direction of the light source unit comprises a driving circuit for driving the organic light-emitting diode.

11. The display device of claim 9, wherein
the light concentration bar further comprises a micro-diffusion structure for diffusing incident light.

12. The display device of claim 11, wherein
the micro-diffusion structure is disposed on the light incidence surface of the light concentration bar.

13. The display device of claim 12, wherein
the micro-diffusion structure is a concave-convex structure on the light incidence surface.

14. The display device of claim 9, wherein
the light incidence surface of the light concentration bar has a width larger than that of the light outgoing surface of the light concentration bar.

* * * * *